May 6, 1947.　　　　　R. HASKINS, JR　　　　　2,419,948
GYRO COMPASS
Filed April 29, 1943　　　　　2 Sheets-Sheet 1

INVENTOR
ROBERT HASKINS, JR.
BY
*Herbert H. Thompson*
his ATTORNEY

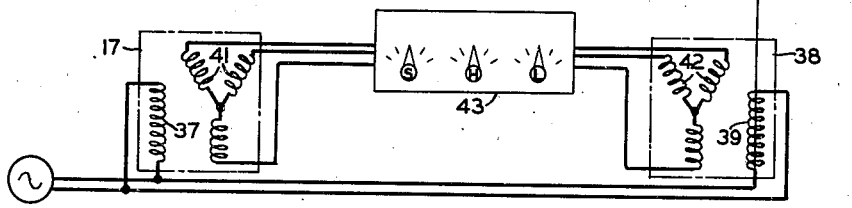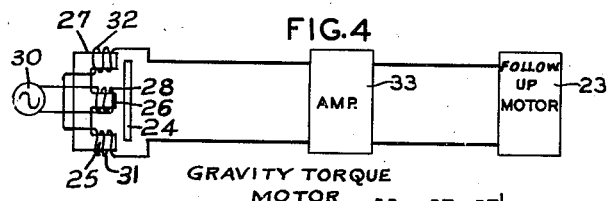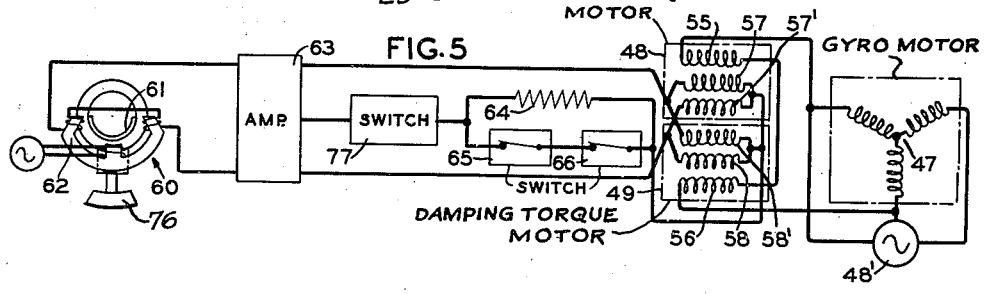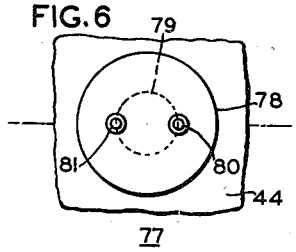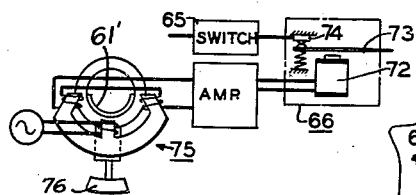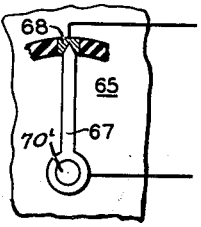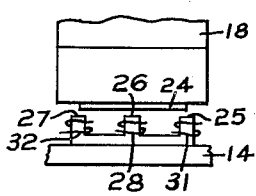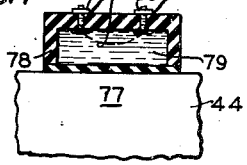

Patented May 6, 1947

2,419,948

UNITED STATES PATENT OFFICE 2,419,948

GYROCOMPASS

Robert Haskins, Jr., Garden City, N. Y., assignor to Sperry Gyroscope Company, Inc., a corporation of New York Application April 29, 1943, Serial No. 485,077

17 Claims. (Cl. 33—226)

While the gyroscopic compass has come into wide use for ships which move at comparatively moderate speeds, it has so far not proved acceptable for aircraft which travel at much greater velocity and rates of turn, in spite of the fact that a gyro compass has many known advantages over all forms of magnetic compasses. The principal object of the present invention is to overcome certain limitations of the gyro compass to enable it to be successfully employed on aircraft and other high speed craft. For this purpose, I propose to greatly reduce the settling time of a standard gyro compass, which is on the order of 85 minutes, so that if displaced from the meridian it will quickly return thereto, since on high speed craft an error which persists for over an hour would cause a serious deviation from course. However, in order that the spin axis may move from its correct position on the virtual meridian for one speed and heading of the craft to its new correct position for a changed speed or heading of the craft, it is necessary that a torque be exerted on the compass during the change, sufficient to move it to the new correct position by the time the change is completed. It is known that this condition is satisfied only if the undamaged period of the compass is approximately $$T = 2\pi\sqrt{\frac{R}{g}}$$

where R is the radius of the earth and $g$ is the acceleration of gravity for that particular latitude. This correct value of the period varies slightly from eighty-five minutes, depending upon the latitude. I propose, therefore, to construct my improved compass with a variable or multiperiod of oscillation, the normal period being a short period of a few minutes, say 5 to 10 minutes; and changing over to or introducing automatically a long period of about 85 minutes whenever a change of speed or course takes place.

One of the objects of the present invention, therefore, is to provide a variable or multiperiod gyro compass or an instrument of this character that normally operates on a period of a few minutes and is controlled to change to a conventional long period when affected by acceleration.

A feature of the invention resides in the provision of an acceleration responsive means for changing the torque applied per degree of tilt of the gyro compass to alter the period of the instrument from a short to a long period during acceleration.

Another feature of the invention consists in provision of a means for reducing intercardinal errors in the compass, that is, errors due to rolling or pitching of the craft on which it is mounted. I propose to accomplish this purpose by temporarily eliminating or reducing the torque which imparts meridian-seeking properties of the compass, that is, the torque usually termed the gravitational torque, during the times when the trunnion axis of the compass is tilted out of the horizontal plane or, in other words, is tilted about the north-south axis in the E-W plane. By eliminating such torque at this time, intercardinal errors are greatly reduced.

Other objects, features and structural details of the invention will be apparent from the following description when read in relation to the accompanying drawing, wherein Fig. 1 is a side elevation of a gyro compass constructed in accordance with the present invention, with the casing of the same shown in section;

Fig. 2 is a diagrammatic view of the transmitter and receiver compass repeater arrangement controlled by the gyro compass;

Fig. 3 is a detailed side elevation of the pick-off employed to govern the follow-up motor;

Fig. 4 is a schematic wiring diagram showing the manner in which the phantom ring motor is controlled;

Fig. 5 is a diagrammatic view showing the improved circuit for controlling the period of the gyro compass;

Fig. 6 is a detail plan view of the switch shown in Fig. 1 on the top of the rotor bearing case of the instrument;

Fig. 7 is a vertical cross section of the switch shown in Fig. 6;

Fig. 8 is a schematic view showing the time delay control switch that is responsive to linear accelerations having a component in a N-S plane;

Fig. 9 is a detail front elevation of the normally closed switch that is responsive to angular velocity about a vertical axis.

Figure 1:
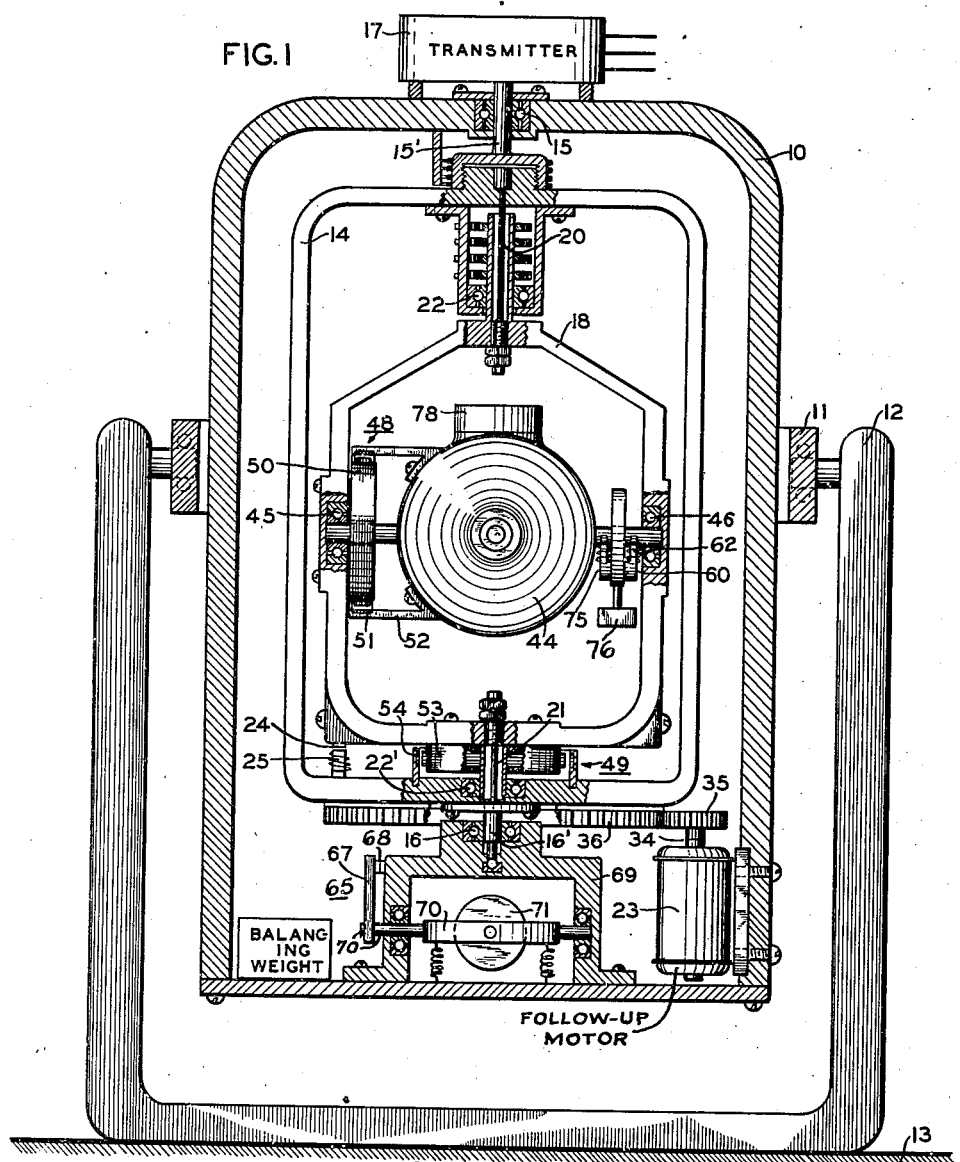

As particularly shown in Fig. 1, the improved gyro compass instrument includes an outer casing or binnacle 10 that is universally mounted by means of gimbal ring 11 and yoke 12 upon a base 13. Casing 10 is pendulously supported in its universal mounting. A phantom or follow-up ring 14 is rotatably mounted within the enclosing casing 10 by upper and lower bearings respectively indicated at 15 and 16, journaling shafts 15' and 16', respectively. These bearings and shafts define a vertical axis about which the phantom ring is oriented in a conventional manner from the sensitive element of the compass. The azimuthal position of the ring is employed in the present instance to position the rotor of a Selsyn transmitter generally indicated at 17. The sensitive element of the compass comprises a vertical ring 18 mounted for rotation within the phantom ring 14 by means of suspension wires 20, 21 and guide bearings 22 and 22'. Rings 14 and 18 are coaxial and angular displacement therebetween is effective to control a motor 23 that operates in a conventional manner to cause the phantom to follow the vertical ring in azimuth.

The provisions made to carry out this function in the present instance, as shown in Figs. 1, 3 and 4 include an electromagnetic "E" pick-off having an armature 24 fixed to the bottom of the vertical ring 18. The other element of the pick-off is mounted on the phantom ring 14 and consists of a permeable core having three pole pieces 25, 26 and 27. The central leg or pole piece of the pick-off has a winding 28 thereon which is energized from a suitable A. C. source 30. The outer legs or pole pieces 25 and 27 have opposed windings 31 and 32 thereon so that a phase sensitive signal is obtained therefrom in accordance with the direction of departure of the rings 14 and 18 from their normal relative position in azimuth. When armature 24 covers equal portions of the outer pole pieces, no signal is derived from the pick-off. The signal of the pick-off is amplified by a suitable phase sensitive amplifier 33 and is fed to the reversible motor 23 whose shaft 34 moves the phantom ring 14 by way of gears 35 and 36 to restore the rings 14 and 18 to a properly oriented relationship in which there is no angular displacement therebetween.

The directional reference supplied by the instrument is obtained from the phantom ring which in this instance positions the rotor 37, Fig. 2 of the Selsyn transmitter 17. The Selsyn receiver 38 has a rotor 39 that positions a compass card 40 of a repeater compass in a manner well-known in the art. Suitable compass corrections may or may not be introduced in the repeater readings. If such corrections are desired, a corrector 43 may be employed equipped with settings for speed "S," heading "H" and latitude "L" of the craft. As this invention is not concerned with this device, no details are shown.

With further reference to Fig. 1, the improved gyro compass further includes a rotor bearing case 44 which is pivoted within the ring 18 for freedom about a horizontal axis in a conventional manner such as by means of the bearings 45 and 46 which normally lie E-W. The gyro rotor (not shown) is mounted within the case 44 in a conventional manner, the spin axis of the rotor normally lying N-S and being normal to the plane of the paper in the showing thereof in Fig. 1. The gyro motor may be electrically spun by a suitable motor (not shown) whose stator windings 47 may be supplied with A. C. electrical energy from source 48', as particularly shown in Fig. 5.

In accordance with the teaching of the present invention, both a damping and gravitationally responsive or meridian seeking torque exerting means are employed, said torques normally having a substantially fixed ratio to one another at the shorter of the two periods at which the compass functions. For the short period, this ratio may be chosen to give normal or somewhat greater than normal damping. In the present instance, separate motors are employed to function in this relation, the gravity torque motor 48 and a damping torque motor 49. The motor 48 imparts meridian-seeking properties to the compass and therefore acts in place of the torque usually exerted directly by gravity, and I therefore usually refer to it herein, for the sake of brevity, as the gravity torque motor. It acts to exert a torque about the horizontal axis of the rotor case of the instrument. The damping torque motor 49 is effective to exert a torque about the axis of the vertical ring 18. The torque motors employed may be of the conventional squirrel cage induction type having a wound stator and an inductive rotor in each instance. The stator 50 for motor 48 is suitably fixed to one of the inwardly disposed side faces of the vertical ring. The inductive rotor 51 of this motor is mounted on a bracket 52 located on the case 44. The stator and rotor for motor 49 are respectively indicated at 53 and 54. Stator 53 is mounted on the ring 18 at the base portion thereof and rotor 54 is fixed to the phantom ring 14. The stators of the respective motors are preferably two phase wound. As shown in Fig. 5, winding 55 of motor 48 and winding 56 of motor 49 are continuously supplied with energy from the source of energy 48'. The control windings 57, 57' of motor 48 and similar windings 58, 58' for motor 49 are included in the novel gyro compass control circuit.

This circuit includes means for producing a signal responsive to tilt of the rotor case of the gyro compass in the form of an "E" pick-off of the general character previously described in connection with Fig. 3. In this instance, the pick-off generally indicated at 60 has a curved armature 61 mounted on one of the trunnions of the rotor case 14. The three-legged magnetic core 62 (see Fig. 5) of the pick-off depends pendulously from the horizontal axis of the case on pendulous plate 76 and thus provides a vertical reference for the instrument. The windings for the pick-off are similar to those previously described, the pick-off providing a phase sensitive signal output that is utilized to energize the control motor windings 57, 58 or 57', 58' of both motors 48 and 49 to obtain the gravity and damping torque necessary to maintain the spin axis of the gyro compass in a N-S plane and free of tilt. The foregoing pick-off is shown more in detail in Fig. 6 of the copending application of J. C. Wilson and O. E. Esval, Serial No. 463,286, for Transformer pick-off, filed October 24, 1942. An amplifier 63 may be employed to amplify the signal output of the pick-off 60.

When no acceleration is present, i. e., when the ship's course and speed remain constant, the full amplified output of the pick-off is available to directly control the gyro compass. The relatively large gravity and damping torque then available provides a gyro compass with a relatively short period, say on the order of a few minutes, for example, 5 or 10 minutes. To change the period of the gyro compass from short to long as acceleration occurs (which latter period is preferably the standard period of about 85 minutes or an hour and a half, as hereinbefore stated), I provide in the control circuit a normally by-passed resistor 64 which, when in circuit, reduces the strength of the signal or control current supplied to both torque exerting means when it is included in series relation in the circuit. As shown in Fig. 5, resistor 64 shunts two normally closed switches designated generally by the respective reference numbers 65 and 66. Both switches 65 and 66 are responsive to acceleration to change the controlling circuit for the torque motors to include the resistor 64 therein, one switch 65 being responsive to acceleration due to turns and the other, 66, to that due to speed changes. By this arrangement, which would leave the ratio of the meridian-seeking to the damping torque unchanged, it may be demonstrated either mathematically or experimentally that the percentage damping is greatly decreased, which result is desirable because during turns or change in speed the damping factor causes an error in the compass, as has long been recognized in the art.

As particularly shown in Figs. 1 and 9, switch 65 comprises a movable arm 67 that moves off the connecting segment 68 under control of a turn responsive device operated by movement of the craft about a vertical axis. The device provided in the present instance is a rate of turn gyro that is mounted in a base plate 69 on the bottom of the casing 10. This gyro device, which is of conventional construction, includes a spring centralized bearing ring 70 and gyro rotor 71 that is preferably driven by a motor (not shown). The spin axis of the rotor 71 and the axis of ring 70 are normally horizontal, the gyro precessing about its axis responsive to turning movement of the craft about its vertical axis to swing the switch arm 67 so that the same breaks contact with segment 68. This switch is therefore responsive to acceleration forces caused by turning or change of course.

In Fig. 8 I have shown a switch responsive to acceleration forces due to change of speed having an N-S component. Switch 66 comprises an alternating current delayed action relay 72 whose armature 73 is spring pressed against contact 74. Such delayed action relays are well known in the trade. The coil is energized by a pick-off 75 similar in construction to pick-off 60. Mounting plate or pendulum 76 is employed for both pick-offs 75 and 60 in this instance, as shown in Fig. 1. The pendulum 76 is responsive to any linear acceleration having a component in a N-S plane, such as due to a change of speed in the N-S direction, and if the resulting movement thereof is of sufficient magnitude and duration, a signal is produced by the pick-off to effect the operation of the relay 72. Relay 72 functions as a time delay control of the switch that is not responsive to momentary fluctuations in the output of the controlling pick-off 75, due to rolling and pitching, which have a quick period.

I prefer also to provide a means for reducing intercardinal rolling error, sometimes referred to as quadrantal error, in my improved compass, for which purpose I include in the circuit a normally closed switch 77 (Figs. 6 and 7) that is responsive to oscillatory motions about the N-S axis (i. e., responsive to tilt of the trunnion axis 45—46 out of the horizontal in the E-W plane) to cause the torque motors to be effective only when the craft is substantially horizontal. It will be understood that when the rotor case is swung back and forth during rolling or pitching movements of the craft, giving rise to violent accelerations, or when the trunnion axis 45—46 is tilted through a substantial angle, switch 77 is effective to momentarily open the control circuit. The means employed to perform this function renders the control signal ineffective when the gyro compass is rocked due to the oscillatory motions of the craft. The phase displacement between the position of the entire pendulous assembly and the bubble in the switch causes the bubble to be displaced from equilibrium when the oscillatory acceleration is a maximum. As particularly shown in Figs. 6 and 7, the means provided is a switch of the liquid level type whose insulated casing 78 is situated on top of the rotor bearing case 44. The liquid enclosed within the case as indicated at 79 is current conducting and the bubble 79' formed therein moves responsive to tilt of the switch to cover one or the other of the conducting contacts 80 and 81 and effectively reduce the current flowing through the switch. The contacts in this instance are normally situated E-W in a horizontal plane so that the switch is responsive to rolling or pitching movements of the instrument about the N-S axis, i. e., to tilt of the trunnion axis 45—46, which always lies E-W. The switch is consequently effective to reduce the torque motor control of the gyro compass at periods of disturbing accelerations, or whenever the trunnion axis is inclined and thus minimize the intercardinal rolling error.

Figure 10:
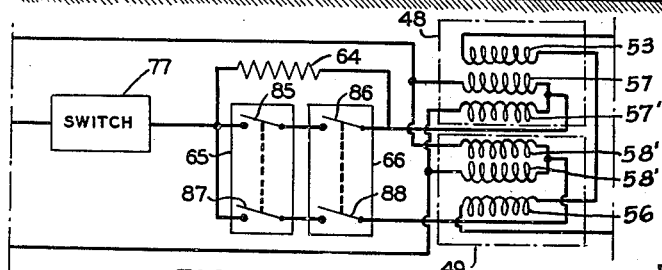
Fig. 10 is a modification of the circuit shown in Fig. 5.

While, as above explained, the percentage damping is reduced at the time the ship changes course or speed, I find it preferable to entirely eliminate the damping at this time. In other words, I prefer to employ a damper only when the compass is operating on the short period. Such a modification is illustrated in the modified form of circuit shown in Fig. 10, wherein the torque motors 48 and 49 are arranged so that the switches 65 and 66 render the damping torque motor ineffective, responsive to acceleration and simultaneously effect the necessary reduction in the strength of the current supplied to the gravity torque motor. In this arrangement switches 65 and 66 which are controlled in the manner previously described, are formed with two poles instead of one. As shown, the control circuit for the gravity torque motor 48 includes the parallel arranged resistor 64 and two of the series connected poles 85 and 86 of the modified switches 65 and 66. When the switches 65 and 66 are in their normal closed position, the control signal for the gravity torque motor 48 shunts the resistor 64. The poles 87 and 88 of the switch are in a second circuit which includes the damping torque motor 49. Normally poles 87 and 88 are in the closed position so that the circuit through the damping torque motor is completed. The respective double pole switches 65 and 66 are effective in this instance to reduce the control current supplied to the gravity torque motor and to open the circuit containing the damping torque motor.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A variable period gyro compass having a gravity torque exerting means, a damping torque exerting means, means providing a control signal for both said gravity and damping torque exerting means responsive to tilt of the rotor case of the gyro compass, circuit means operable to simultaneously reduce the amplitude of the control signal to the gravity torque means and render the damping torque means ineffective, and acceleration responsive means for controlling said circuit means.

2. A variable period gyro compass having a gravity torque exerting means, a damping torque exerting means, means responsive to tilt of the rotor case of the gyro compass for producing a signal, circuit means controlling said gravity torque exerting means and said damping torque exerting means from said signal, a normally ineffective auxiliary circuit for reducing the strength of the signal current fed to said gravity torque exerting means, and acceleration responsive means simultaneously operable to render said auxiliary circuit effective and to open the circuit to said damping means.

3. A short period gyro compass for dirigible vehicles having a normally effective damping factor, a gravity-actuated tilt detecting means, means controlled thereby for applying a meridian-seeking torque on the compass such as to give the compass normally a period of a few minutes, and a common means operative during turns for substantially eliminating said damping and for reducing said torque sufficiently to lengthen the period of the compass to approximately 84 minutes during turns.

4. A dual period gyro compass having a normal period on the order of a few minutes and a secondary period on the order of one and one-half hours, a transient damping means for said compass, and means for rendering said damping means operative only during the time the compass has the shorter period.

5. A dual period gyro compass having a normal period on the order of a few minutes and a secondary period on the order of one and one half hours, means for changing the compass from its normal to its secondary period, and means responsive to turn of the craft for bringing said first means into action.

6. In a gyro compass having a rotor bearing frame mounted for freedom about a vertical and a normally horizontal E-W axis and a rotor journaled therein with its spin axis normally lying horizontal and N-S, means responsive to tilt of said spin axis about said E-W axis, means controlled thereby for exerting a meridian-seeking torque on said frame, means for detecting tilt of said E-W axis out of the horizontal, and means responsive to said last-named tilt detecting means for temporarily eliminating said torque during such tilt.

7. A variable period gyro compass having a rotor case mounted for freedom about a vertical and a horizontal axis and a gravity and damping torque exerting means for said compass, means providing a signal controlling said torque exerting means and responsive to tilt of the rotor case about said horizontal axis, and means for changing the amount of the torque exerted by said torque exerting means per degree of tilt of the compass to vary the period of the compass.

8. A gyro compass having a rotor case mounted for freedom about a vertical and a normally horizontal E-W axis and a gravity torque exerting means for said compass for imparting meridian-seeking properties thereto responsive to tilt of the rotor case about said E-W axis, and means rendered effective by tilt about a N-S axis or accelerations having an E-W component for temporarily rendering ineffective said torque exerting means.

9. Means for electrically controlling a gyro compass comprising an energy source, means supplied by said source for producing a signal responsive to tilt of the rotor case of the gyro compass, a circuit including said signal producing means, a gravity torque motor normally controlled from said signal means, and means rendered effective by tilt or lateral acceleration of the rotor casing in the E-W vertical plane or direction for temporarily eliminating the control of said motor from said signal.

10. Means for electrically controlling a gyro compass comprising an energy source, means supplied by said source for producing a signal responsive to tilt of the rotor case of the gyro compass, a circuit including said signal producing means, a gravity torque motor and a damping torque motor normally controlled from said signal means, and means rendered effective by tilt of the rotor casing in the E-W vertical plane for temporarily eliminating the control of said motors from said signal.

11. Means of the character claimed in claim 10, in which said last named means is a liquid level switch mounted on the rotor case of the gyro compass with its contacts positioned in the E-W plane.

12. A dual period gyro compass as claimed in claim 10, having a normal damper and means likewise responsive to change of speed or course for rendering said damper temporarily inoperative.

13. A dual period gyro compass having a normal period on the order of a few minutes, means for temporarily altering said period to a secondary period on the order of one and one-half hours, and means responsive to change of speed or course of the vehicle for bringing said first-named means into operation.

14. A variable period gyro compass for vehicles having a gravitationally controlled torque-exerting means normally adapted to exert a strong torque and intermittently adapted to exert a much weaker torque, means providing a control signal for said torque-exerting means responsive to tilt of the rotor case of the gyro compass, and means rendered effective by acceleration of said vehicle for temporarily altering the torque normally exerted by said gravity means from strong to weak, whereby the period of the gyro compass is normally a few minutes, but during acceleration becomes substantially 85 minutes.

15. Means for electrically controlling a multi-period gyro compass comprising an energy source, means supplied by said source for producing a signal responsive to tilt of the rotor case of the gyro compass, a circuit including said signal producing means, a gravity torque motor, a damping torque motor controlled from said signal, means in the circuit between said signal and motors for temporarily decreasing the torque of at least the gravity torque motor for any given signal strength, and acceleration responsive means for bringing said torque increasing means into operation upon change of speed or course of the ship.

16. A circuit means for controlling a gyro compass that includes a gravity torque motor, a damping torque motor and a signal generator responsive to tilt of the rotor case of the gyro compass for controlling said motors, comprising an impedance in the circuit between said signal and said motors, and an E-W roll responsive, normally closed switching means shunting said impedance, whereby the impedance is effective to normally reduce the torque exerted by the motors during E-W rolling of the compass.

17. As a means for reducing rolling error in gyro compasses, the combination with a gyro compass having a gravitationally responsive torque-applying device for imparting meridian-seeking properties, means mounted on said compass for detecting and producing a signal upon tilt or roll of the compass in the E-W plane, and means responsive to said signal for temporarily eliminating such gravitational torque during such tilt.

ROBERT HASKINS, Jr.

REFERENCES CITED

The following references are of record in the file of this patent:

UNITED STATES PATENTS

| Number | Name | Date |
|---|---|---|
| 1,686,524 | Hight | Oct. 9, 1928 |
| 1,773,411 | Thompson | Aug. 19, 1930 |
| 1,628,136 | Ford | May 10, 1927 |
| 1,777,601 | Brown | Oct. 7, 1930 |
| 1,773,412 | Thompson | Aug. 19, 1930 |

FOREIGN PATENTS

| Number | Country | Date |
|---|---|---|
| 255,745 | British | July 29, 1926 |

Certificate of Correction

Patent No. 2,419,948.  May 6, 1947.

ROBERT HASKINS, Jr.

It is hereby certified that errors appear in the printed specification of the above numbered patent requiring correction as follows: Column 1, line 26, for "undamaged" read *undamped*; column 5, lines 43 and 44, for "havin an" read *having an*; and that the said Letters Patent should be read with these corrections therein that the same may conform to the record of the case in the Patent Office.

Signed and sealed this 12th day of August, A. D. 1947.

[SEAL]

LESLIE FRAZER,
*First Assistant Commissioner of Patents.*